US00RE42125E

(19) United States
(12) Reissued Patent
Damji et al.

(10) Patent Number: US RE42,125 E
(45) Date of Reissued Patent: Feb. 8, 2011

(54) DEVELOPMENT BIAS CONNECTOR WITH INTEGRAL BEARING SUPPORT

(75) Inventors: Dhirendra C. Damji, Niskayuna, NY (US); Ajay Kumar, Fairport, NY (US); Daniel A. Chiesa, Webster, NY (US)

(73) Assignee: Xerox Corporation, Norwalk, CT (US)

(21) Appl. No.: 11/652,134

(22) Filed: Jan. 11, 2007

Related U.S. Patent Documents

Reissue of:
(64) Patent No.: 5,822,654
Issued: Oct. 13, 1998
Appl. No.: 08/970,719
Filed: Nov. 14, 1997

(51) Int. Cl.
*G03G 21/16* (2006.01)

(52) U.S. Cl. ..... 399/111
(58) Field of Classification Search ..... 399/111, 399/119, 222, 240, 265, 270, 285
See application file for complete search history.

(56) References Cited

U.S. PATENT DOCUMENTS

| | | | | |
|---|---|---|---|---|
| 4,839,690 A | | 6/1989 | Onoda et al. | |
| 4,942,429 A | * | 7/1990 | Kakitani | 399/119 |
| 4,951,599 A | | 8/1990 | Damji | |
| 5,196,889 A | | 3/1993 | Ronnenberg et al. | |
| 5,296,901 A | | 3/1994 | Davies | |
| 5,305,062 A | | 4/1994 | Sato et al. | |
| 5,345,294 A | | 9/1994 | Nomura et al. | |
| 5,463,446 A | | 10/1995 | Watanabe et al. | |
| 5,581,325 A | | 12/1996 | Tsuda et al. | |
| 5,724,634 A | * | 3/1998 | Maruta | |
| 6,169,865 B1 | * | 1/2001 | Miyabe et al. | 399/111 |

FOREIGN PATENT DOCUMENTS

| | | |
|---|---|---|
| DE | A-4 134106 | 4/1992 |
| GB | A-2 214 575 | 9/1989 |
| JP | 03-200270 A | 9/1991 |
| JP | 07-160146 | 6/1995 |

* cited by examiner

*Primary Examiner*—Susan S Lee
(74) *Attorney, Agent, or Firm*—Oliff & Berridge, PLC

(57) ABSTRACT

A bearing support for use in a process cartridge including a roll rotatably mounted to a housing is provided. The roll is used for transporting marking particles to a latent image to form a developed image. The bearing support supports the roll and provides an electrical path between the roll and a voltage source. The bearing support includes a body having a first feature for cooperation with the roll and a second feature for cooperation with the housing. At least one of the first feature and the second feature provides for rotatable motion between the housing and the roll. The bearing support further includes a third feature for providing an electrical path between the roll and the voltage source.

25 Claims, 11 Drawing Sheets

DEVELOPMENT BIAS CONNECTOR WITH INTEGRAL BEARING SUPPORT

Matter enclosed in heavy brackets [ ] appears in the original patent but forms no part of this reissue specification; matter printed in italics indicates the additions made by reissue.

RELATED CASES

Cross reference is made to the following applications filed concurrently herewith: U.S. patent application Ser. No. 08/971,073 entitled "Pin Charge Corotron With Optimum Dimensions For Minimum Ozone Production" by Dhirendra C. Damji et al., U.S. patent application Ser. No. 08/971,842 entitled "Charging Device Module For Use With Print Cartridge" by Ajay Kumar et al., U.S. patent application Ser. No. 08/971,098 entitled "Charging Device Having An Electrode With Integral Electrical Connector" by Ajay Kumar et al., Attorney Docket Number U.S. patent application Ser. No. 08/971,015 entitled "Charging Device Having A Shield With Integral Electrical Connector" by Ajay Kumar et al., U.S. patent application Ser. No. 08/970,322 entitled "Process Cartridge Including Process Components Having Critical Image Quality And Life-Extending Process Path Acting Regions" by Dhirendra C. Damji et al., U.S. patent application Ser. No. 08/971,690 entitled "Variable Size, Replaceable Toner Sump Pans For Print Cartridges" by Dhirendra C. Damji et al., U.S. patent application Ser. No. 08/970,313 entitled "Molded Quick Change Photoreceptor Support" by Ajay Kumar et al., U.S. patent application Ser. No. 08/971,010 entitled "Printing Cartridge With Planar Drive Train" by Ajay Kumar et al., U.S. patent application Ser. No. 08/970,839 entitled "Process Cartridge Including A Handle Defining Part Of A Machine Paper Path" by Dhirendra C. Damji et al., U.S. patent application Ser. No. 08/970,321 entitled "Electrostatographic Process Cartridge Having A Non-Metallic Photoreceptor Grounding Pin" by Daniel A. Chiesa et al., U.S. patent application Ser. No. 08/970,318 entitled "Limited Life Electrostatographic Process Cartridge Having A Waste Toner Electro-Sump Subassembly" by Daniel A. Chiesa et al., U.S. patent application Ser. No. 08/970,354 entitled "Process Cartridge Having A Drive Assembly Resultant Force Counter-Acting Member" by Dhirendra C. Damji el al., U.S. patent application Ser. No. 08/970,320 entitled "Process Cartridge Including A Banding Defect Preventing Waste Toner Moving Auger" by Dhirendra C. Damji et al., U.S. patent application Ser. No. 08/971,323 entitled "Process Cartridge Including A Developer Housing Defining Part Of A Machine Paper Path" by Dhirendra C. Damji et al., U.S. patent application Ser. No. 08/970,847 entitled "All-in-One Process Cartridge Including A Photoreceptor And Process Components Having Relative Critical, Image Quality Acting Regions" by Dhirendra C. Damji et al., U.S. patent application Ser. No. 08/971,691 entitled "Printing Cartridge With Molded Cantilever Developer Roller Spacing Spring" by Ajay Kumar et al., and U.S. patent application Ser. No. 08/970,319 entitled "User Interface For An Electrostatographic Reproduction Machine" by Mark L. Leveto.

BACKGROUND

This invention relates to electrostatographic reproduction machines, and more particularly to an economical and capacity-extendible all-in-one process cartridge for easy adaptive use in a family of compact electrostatographic reproduction machines having different volume capacities and consumable life cycles. Specifically this invention relates to such a cartridge including a development bias connector with integral bearing support.

Generally, the process of electrostatographic reproduction, as practiced in electrostatographic reproduction machines, includes charging a photoconductive member to a substantially uniform potential so as to sensitize the surface thereof. A charged portion of the photoconductive surface is exposed at an exposure station to a light image of an original document to be reproduced. Typically, an original document to be reproduced is placed in registration, either manually or by means of an automatic document handler, on a platen for such exposure.

Exposing an image of an original document as such at the exposure station, records an electrostatic latent image of the original image onto the photoconductive member. The recorded latent image is subsequently developed using a development apparatus by bringing a charged dry or liquid developer material into contact with the latent image. Two component and single component developer materials are commonly used. A typical two-component dry developer material has magnetic carrier granules with fusible toner particles adhering triobelectrically thereto. A single component dry developer material typically comprising toner particles only can also be used. The toner image formed by such development is subsequently transferred at a transfer station onto a copy sheet fed to such transfer station, and on which the toner particles image is then heated and permanently fused so as to form a "hardcopy" of the original image.

It is well known to provide a number of the elements and components, of an electrostatographic reproduction machine, in the form of a customer or user replaceable unit (CRU). Typically such units are each formed as a cartridge that can be inserted or removed from the machine frame by a customer or user. Reproduction machines such as copiers and printers ordinarily include consumable materials such as toner, volume limiting components such as a waste toner container, and life cycle limiting components such as a photoreceptor and a cleaning device. Because these elements of the copying machine or printer must be replaced frequently, they are more likely to be incorporated into a replaceable cartridge as above.

There are therefore various types and sizes of cartridges, varying from single machine element cartridges such as a toner cartridge, to all-in-one electrostatographic toner image forming and transfer process cartridges. The design, particularly of an all-in-one cartridge can be very costly and complicated by a need to optimize the life cycles of different elements, as well as to integrate all the included elements, while not undermining the image quality. This is particularly true for all-in-one process cartridges to be used in a family of compact electrostatographic reproduction machines having different volume capacities and elements having different life cycles.

There is therefore a need for a quality image producing, economical and capacity-extendible all-in-one process cartridge that is easily adapted for use in various machines in a family of compact electrostatographic reproduction machines having different volume capacities and elements with different life cycles.

For proper development of a charged surface with marking particles, preferably, an electrical bias is applied at various positions along the developing process. One of the places in which an electrical charge is applied is the development control. An electrical bias is applies at the outer periphery of the developing roll. Since the outer periphery of the developer roll rotates, the electrical charge on the rotating outer periphery must be commutated in order that it be received from a power source.

Attempts have been made at commutating a developer roll. For example, a metallic brush may be used between a stationary and rotating element to commutate the roll. Further, a metal rolling element bearing may be used. For a rolling element bearing a conductor grease may be required to adequately commutate the roll. The use of a brush or rubbing element to commutate a roll adds cost and provides a wear item which requires replacement. The use of a conductive bearing is expensive and also is only moderately successful at commutating due to the problems with conductive grease.

The following disclosures may be relevant to various aspects of the present invention:

U.S. Pat. No. 4,839,690

Patentee: Onoda et al.

Issue Date: Jun. 13, 1989

U.S. Pat. No. 5,296,901

Patentee: Davies

Issue Date: Mar. 22, 1994

U.S. Pat. No. 5,581,325

Patentee: Tsuda et al.

Issue Date: Dec. 3, 1996

U.S. Pat. No. 5,634,175

Patentee: Michlin et al.

Issue Date: May 27, 1997

U.S. Pat. No. 4,839,690 discloses an image bearing member including a conductive drum including an insulating flange. A conductive member is electrically connected to an inner surface of the conductive drum. The conductive member is electrically connected with a conductive member of a main assembly when the conductive drum is mounted in the main assembly.

U.S. Pat. No. 5,296,901 discloses a method of applying an electrical bias to a magnetic feed roller. A simple contact is attached to a doctor blade having a finger extending therefrom to ride onto the surface of the magnetic roller. The contact connects the doctor blade to the feed roller.

U.S. Pat. No. 5,581,325 discloses a process cartridge including an electroconductive grounding member which is in electric connection with the image bearing member. The grounding member grounds the image bearing member to a main assembly. A removing member is in contact with a region of the image bearing member contactable to the grounding member.

U.S. Pat. No. 5,634,175 discloses a developer roller including an improved contact device that has a conductive cylindrical member with a rim on one end. The member contacts the inner wall of the roller.

SUMMARY OF THE INVENTION

In accordance with one aspect of the present invention, there is provided a bearing support for use in a process cartridge including a roll rotatably mounted to a housing. The roll is used for transporting marking particles to a latent image to form a developed image. The bearing support supports the roll and provides an electrical path between the roll and a voltage source. The bearing support includes a body having a first feature for cooperation with the roll and a second feature for cooperation with the housing. At least one of the first feature and the second feature provides for rotatable motion between the housing and the roll. The bearing support further includes a third feature for providing an electrical path between the roll and the voltage source.

In accordance with another aspect of the present invention, there is provided a process cartridge for use in a printing machine. The process cartridge is used for applying marking particles to a latent image to form a developed image. The process cartridge includes a housing and a bearing support mounted to the housing. The process cartridge further includes a roll rotatably mounted to said bearing. The roll is used for transporting marking particles to the latent image to form the developed image and for receiving an electrical charge from a voltage source. The bearing support supports the roll and provides an electrical path between the roll and the voltage source. The bearing support includes a body having a first feature for cooperation with the roll and a second feature for cooperation with the housing. At least one of the first feature and the second feature provides for rotatable motion between the housing and the roll. The bearing support further includes a third feature for providing an electrical path between the roll and the voltage source.

In accordance with yet another aspect of the present invention, there is provided an electrophotographic printing machine of the type including a process cartridge for applying marking particles to a latent image to form a developed image. The process cartridge includes a housing and a bearing support mounted to the housing. The process cartridge further includes a roll rotatably mounted to the bearing. The roll is used for transporting marking particles to the latent image to form the developed image and for receiving an electrical charge from a voltage source. The bearing support supports the roll and provides an electrical path between the roll and the voltage source. The bearing support includes a body having a first feature for cooperation with the roll and a second feature for cooperation with the housing. At least one of the first feature and the second feature provides for rotatable motion between the housing and the roll. The bearing support further includes a third feature for providing an electrical path between the roll and the voltage source.

BRIEF DESCRIPTION OF THE DRAWINGS

In the detailed description of the invention presented below, reference is made to the drawings, in which.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
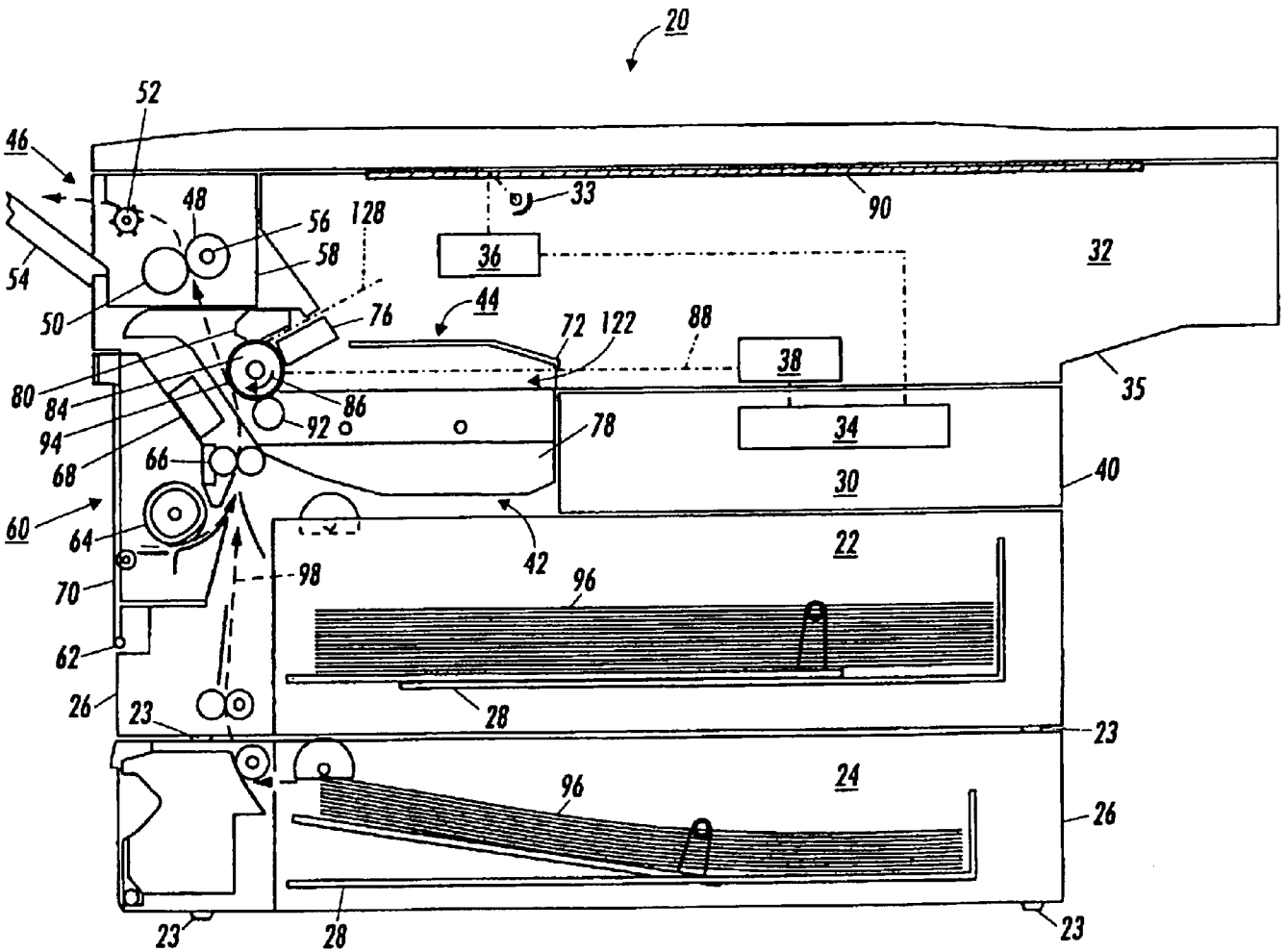
FIG. 1 is a front vertical illustration of an exemplary compact electrostatographic reproduction machine comprising separately framed mutually aligning modules in accordance with the present invention.
Figure 9:
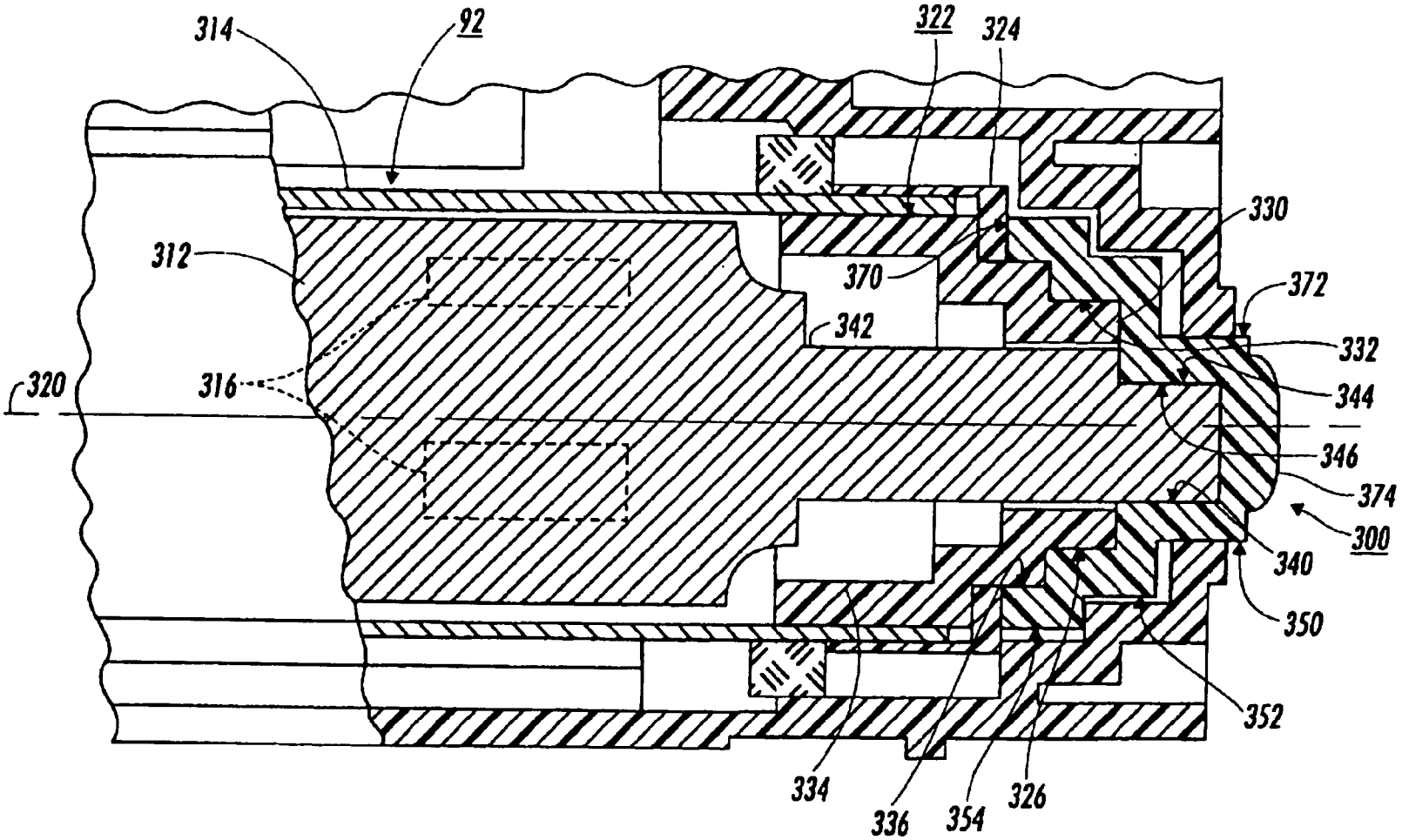
FIG. 9 is a cross sectional view of FIG. 8 along the line 9—9 in the direction of the arrows.

Referring now to FIG. 1 and 9, there is illustrated a frameless exemplary compact electrostatographic reproduction machine 20 comprising separately framed mutually aligning modules according to the present invention. The compact machine 20 is frameless, meaning that it does not have a separate machine frame to which electrostatographic process subsystems are assembled, aligned to the frame, and then aligned relative to one another as is typically the case in conventional machines. Instead, the architecture of the compact machine 20 is comprised of a number of individually framed, and mutually aligning machine modules that variously include pre-aligned electrostatographic active process subsystems.

As shown, the frameless machine 20 comprises at least a framed copy sheet input module (CIM) 22. Preferably, the machine 20 comprises a pair of copy sheet input modules, a main or primary module the CIM 22, and an auxiliary module the (ACIM) 24, each of which has a set of legs 23 that can support the machine 20 on a surface, therefore suitably enabling each CIM 22, 24 to form a base of the machine 20. As also shown, each copy sheet input module (CIM, ACIM) includes a module frame 26 and a copy sheet stacking and lifting cassette tray assembly 28 that is slidably movable in and out relative to the module frame 26. When as preferred here, the machine 20 includes two copy sheet input modules, the very base module is considered the auxiliary module (the ACIM), and the top module which mounts and mutually aligns against the base module is considered the primary module (the CIM).

The machine 20 next comprises a framed electronic control and power supply (ECS/PS) module 30, that as shown mounts onto, and is mutually aligned against the CIM 22 (which preferably is the top or only copy sheet input module). A framed latent image forming imager module 32 then mounts over and is mutually aligned against the ECS/PS module. The ECS/PS module 30 includes all controls and power supplies (not shown) for all the modules and processes of the machine 20. It also includes an image processing pipeline unit (IPP) 34 for managing and processing raw digitized images from a Raster Input Scanner (RIS) 36, and generating processed digitized images for a Raster Output Scanner (ROS) 38. The ECS/PS module 30 also includes harnessless interconnect boards and inter-module connectors (not shown), that provide all power and logic paths to the rest of the machine modules. An interconnect board (PWB) (not shown) connects the ECS controller and power supply boards (not shown) to the inter-module connectors, as well as locates all of the connectors to the other modules in such a manner that their mating connectors would automatically plug into the ECS/PS module during the final assembly of the machine 20. Importantly, the ECS/PS module 30 includes a module frame 40 to which the active components of the module as above are mounted, and which forms a covered portion of the machine 20, as well as locates, mutually aligns, and mounts to adjacent framed modules, such as the CIM 22 and the imager module 32.

The framed copy sheet input modules 22, 24, the ECS/PS module 30, and the imager module 32, as mounted above, define a cavity 42. The machine 20 importantly includes a customer replaceable, all-in-one CRU or process cartridge module 44 that is insertably and removably mounted within the cavity 42, and in which it is mutually aligned with, and operatively connected to, the framed CIM, ECS/PS and imager modules 22, 30, 32.

As further shown, the machine 20 includes a framed fuser module 46, that is mounted above the process cartridge module 44, as well as adjacent an end of the imager module 32. The fuser module 46 comprises a pair of fuser rolls 48, 50, and at least an exit roll 52 for moving an image carrying sheet through, and out of, the fuser module 46 into an output or exit tray 54. The fuser module also includes a heater lamp 56, temperature sensing means (not shown), paper path handling baffles (not shown), and a module frame 58 to which the active components of the module, as above, are mounted, and which forms a covered portion of the machine 20, as well as locates, mutually aligns, and mounts to adjacent framed modules, such as the imager module 32 and the process cartridge module 44.

The machine then includes an active component framed door module 60 that is mounted pivotably at pivot point 62 to an end of the CIM 22. The door module 60 as mounted, is pivotable from a substantially closed vertical position into an open near-horizontal position in order to provide access to the process cartridge module 44, as well as for jam clearance of jammed sheets being fed from the CIM 22. The Door module 60 comprises active components including a bypass feeder assembly 64, sheet registration rolls 66, toner image transfer and detack devices 68, and the fused image output or exit tray 54. The door module 60 also includes drive coupling components and electrical connectors (not shown), and importantly, a module frame 70 to which the active components of the module as above are mounted, and which forms a covered portion of the machine 20, as well as, locates, mutually aligns, and mounts to adjacent framed modules, such as the CIM 22, the process cartridge module 44, and the fuser module 46.

More specifically, the machine 20 is a desktop digital copier, and each of the modules 22, 24, 30, 32, 44, 48, 60, is a high level assembly comprising a self-containing frame and active electrostatographic process components specified for sourcing, and enabled as a complete and shippable product. It is believed that some existing digital and light lens reproduction machines may contain selective electrostatographic modules that are partitioned for mounting to a machine frame, and in such a manner that they could be designed and manufactured by a supplier. However, there are no known such machines that have no separate machine frame but are comprised of framed modules that are each designed and supplied as self-standing, specable (i.e. separately specified with interface inputs and outputs), testable, and shippable module units, and that are specifically crafted and partitioned for enabling all of the critical electrostatographic functions upon a simple assembly. A unique advantage of the machine 20 of the present invention as such is that its self-standing, specable, testable, and shippable module units specifically allow for high level sourcing to a small set of module-specific skilled production suppliers. Such high level sourcing greatly optimizes the quality, the total cost, and the time of delivering of the final product, the machine 20.

Referring now to FIGS. 1–6, the CRU or process cartridge module 44 generally comprises a module housing subassembly 72, a photoreceptor subassembly 74, a charging subassembly 76, a developer subassembly 78 including a source of fresh developer material, a cleaning subassembly 80 for removing residual toner as waste toner from a surface of the photoreceptor, and a waste toner sump subassembly 82 for storing waste toner. The module housing subassembly 72 of the CRU or process cartridge module 44 importantly provides and includes supporting, locating and aligning structures, as well as driving components for the process cartridge module 44.

Still referring to FIG. 1, operation of an imaging cycle of the machine 20 using the all-in-one process cartridge module 44 generally, can be briefly described as follows. Initially, a photoreceptor in the form of a photoconductive drum 84 of the customer replaceable unit (CRU) or process cartridge module 44, rotating in the direction of the arrow 86, is charged by the charging subassembly 76. The charged portion of the drum is then transported to an imaging/exposing light 88 from the ROS 38 which forms a latent image on the drum 84, corresponding to an image of a document positioned on a platen 90, via the imager module 32. It will also be understood that the imager module 32 can easily be changed from a digital scanning module to a light lens imaging module.

The portion of the drum 84 bearing a latent image is then rotated to the developer subassembly 78 where the latent image is developed with developer material such as with charged single component magnetic toner using a magnetic developer roller 92 of the process cartridge module 44. The developed image on the drum 84 is then rotated to a near vertical transfer point 94 where the toner image is transferred to a copy sheet substrate 96 fed from the CIM 22 or ACIM 22 along a copy sheet or substrate path 98. In this case, the detack device 68 of the door module 60 is provided for charging the back of the copy sheet substrate (not shown) at the transfer point 94, in order to attract the charged toner image from the photoconductive drum 84 onto the copy sheet substrate.

The copy sheet substrate with the transferred toner image thereon, is then directed to the fuser module 46, where the heated fuser roll 48 and pressure roll 50 rotatably cooperate to heat, fuse and fix the toner image onto the copy sheet substrate. The copy sheet substrate then, as is well known, may be selectively transported to the output tray 54 or to another post-fusing operation.

The portion of the drum 84 from which the developed toner image was transferred is then advanced to the cleaning subassembly 80 where residual toner and residual charge on the drum 84 are removed therefrom. The imaging cycle of the machine 20 using the drum 84 can then be repeated for forming and transferring another toner image as the cleaned portion again comes under the charging subassembly 76.

The detailed and specific advantageous aspects of the structure and operation of the all-in-one CRU or process cartridge module 44, will now be described with particular reference to FIGS. 1 to 6. As shown, the all-in-one CRU or process cartridge module 44, generally includes six subassemblies comprising the module housing subassembly 72 (FIG. 2); the cleaning subassembly 80; the photoreceptor subassembly 74; the charging subassembly 76; the developer subassembly 78 (FIG. 3); and the waste toner sump subassembly 82. Generally, the function of the all-in-one CRU or process cartridge module 44 in the machine 20 is to electrostatically form a latent image, develop such latent image into a toner image through toner development, and transfer the toner image unfused onto a printing medium, such as a sheet of paper. The CRU or process cartridge module is left-side accessible to an operator facing the CIM 22 by opening the door module 60 (FIG. 1). Once the door module is opened, an operator or customer can remove or insert the CRU or process cartridge module 44 with one hand.

Figure 2:
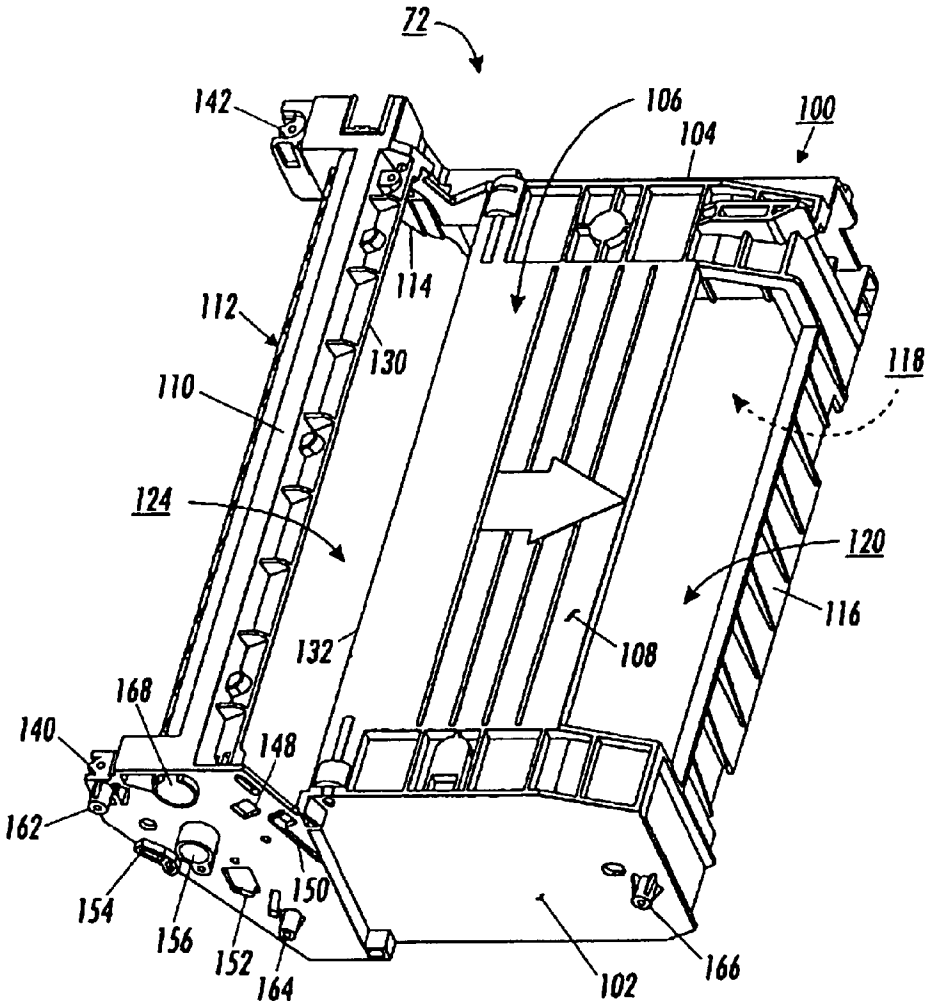
FIG. 2 is a top perspective view of the module housing of the CRU or process cartridge module of the machine of FIG. 1.
Figure 3:
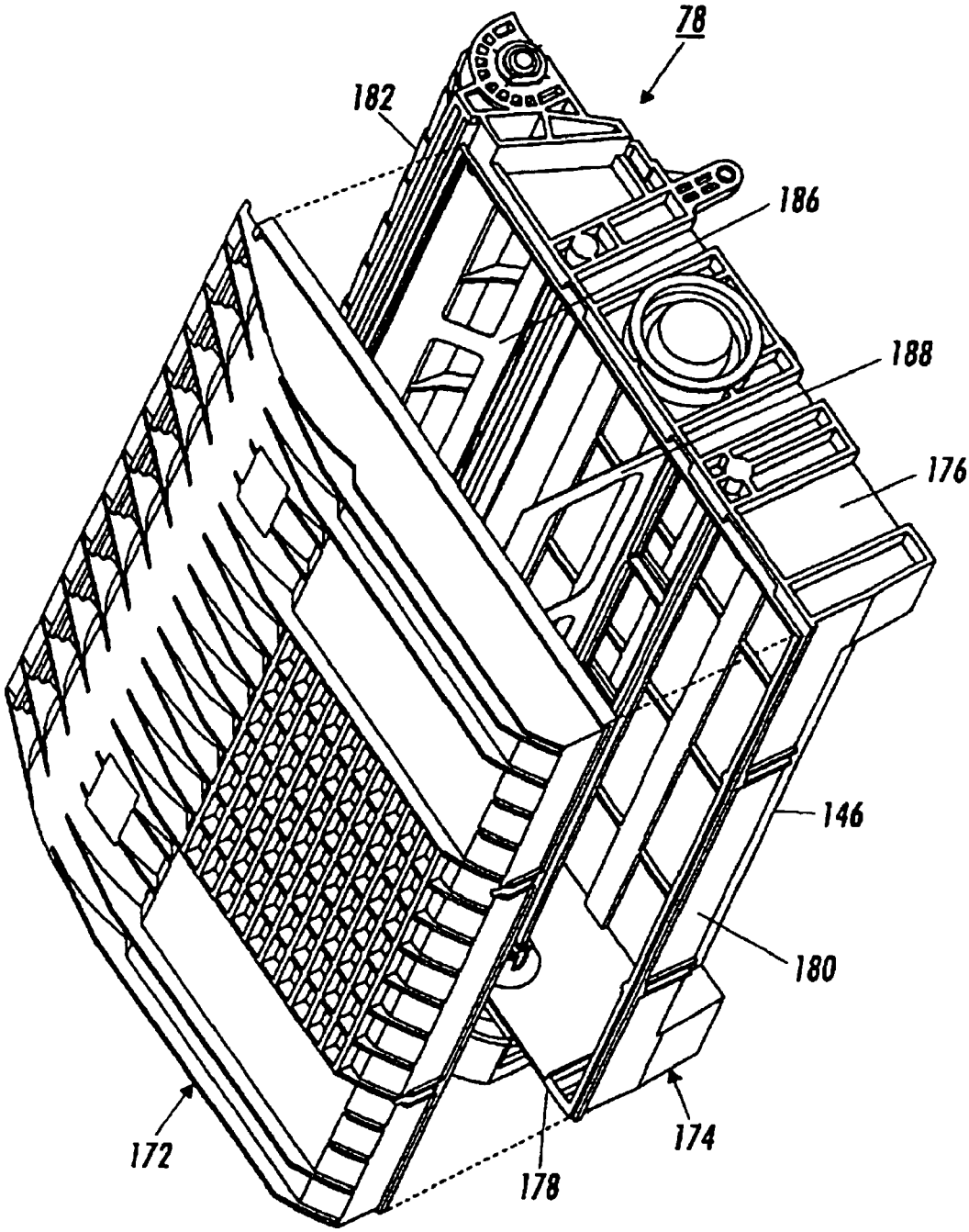
FIG. 3 is a bottom perspective view of the developer subassembly of the CRU or process cartridge module of the machine of FIG. 1 with the bottom of the developer housing unattached.

Referring now to FIGS. 1–6, the module housing subassembly 72 is illustrated (FIG. 2). As shown, it comprises a generally rectangular and inverted trough shaped module housing 100 having a first side wall 102, a second and opposite side wall 104, a top wall 106 including a substantially horizontal portion 108 and a nearly vertical portion 110 defining a raised rear end 112 (rear as considered relative to the process cartridge 44 being inserted into the cavity 42). There is no rear wall, thus resulting in an open rear end 114 for mounting the photoreceptor subassembly 74. The trough shaped module housing also includes a front end wall 116 that connects at an angle to the top wall 106. The trough shaped module housing 100 of course, has no bottom wall, and hence as inverted, it defines a trough region 118 that is wide open for assembling the developer subassembly 78 (FIG. 3). The top wall 106 and the front end wall 116 each include a first cutout 120 formed through their adjoining corner for partially defining a first light path 122 (FIG. 1) for the exposure light 88 from the ROS 38 of the imager module 32. The top wall 106 also includes a second cutout 124 formed thereinto at the adjoining angle between the horizontal 108 and near vertical 110 portions thereof for mounting the charging subassembly 76 (FIG. 5), and for partially defining a second light path 126 (FIGS. 1 and 6) for an erase light 128 being focused into the photoreceptor area at the raised rear end 112 of the module housing 100.

Importantly, the module housing 100 includes two top wall cross-sectional surfaces 130, 132 defining the second cutout 124, and one 130, of these cross-sectional wall surfaces, has a desired angle 134 (relative to the photoreceptor surface) for mounting and setting a cleaning blade 138 (FIG. 6) of the cleaning subassembly 80. Attachment members 140, 142 are provided at the raised rear end 112 and extending from the first and second side walls 102, 104 respectively, for attaching a module handle 144 to the module housing 100.

As pointed out above, the module housing 100 is the main structure of the all-in-one CRU or process cartridge module 44, and importantly supports all other subassemblies (cleaning subassembly 80, charging subassembly 76, developer subassembly 78, and sump subassembly 82) of the all-in-one process cartridge module 44. As such, it is designed for withstanding stresses due to various dynamic forces of the subassemblies, for example, for providing a required re-action force to the developer subassembly 78. Because it is located just about 3 mm below the fuser module 46, it is therefore made of a plastic material suitable for withstanding relatively high heat generated from the fuser module. Mounts (not shown) to the developer subassembly within the trough portion of the module housing subassembly are located such that the top wall 106 of the module housing defines a desired spacing comprising the first light path 122 between it and the top 146 of the developer subassembly. Similarly, the raised rear end 112 of the top wall 106 of the module housing is also such as to define a desired spacing between the charging subassembly 76 and the photoreceptor or drum 84, when both are mounted to the raised rear end 112 of the module housing 100. Additionally, the module housing 100 provides rigidity and support to the entire process cartridge module 44, and upon assembly mutually self-aligns the CRU or process cartridge module 44 relative to abutting modules such as the CIM 22, and ECS/PS module 30.

Figure 5:
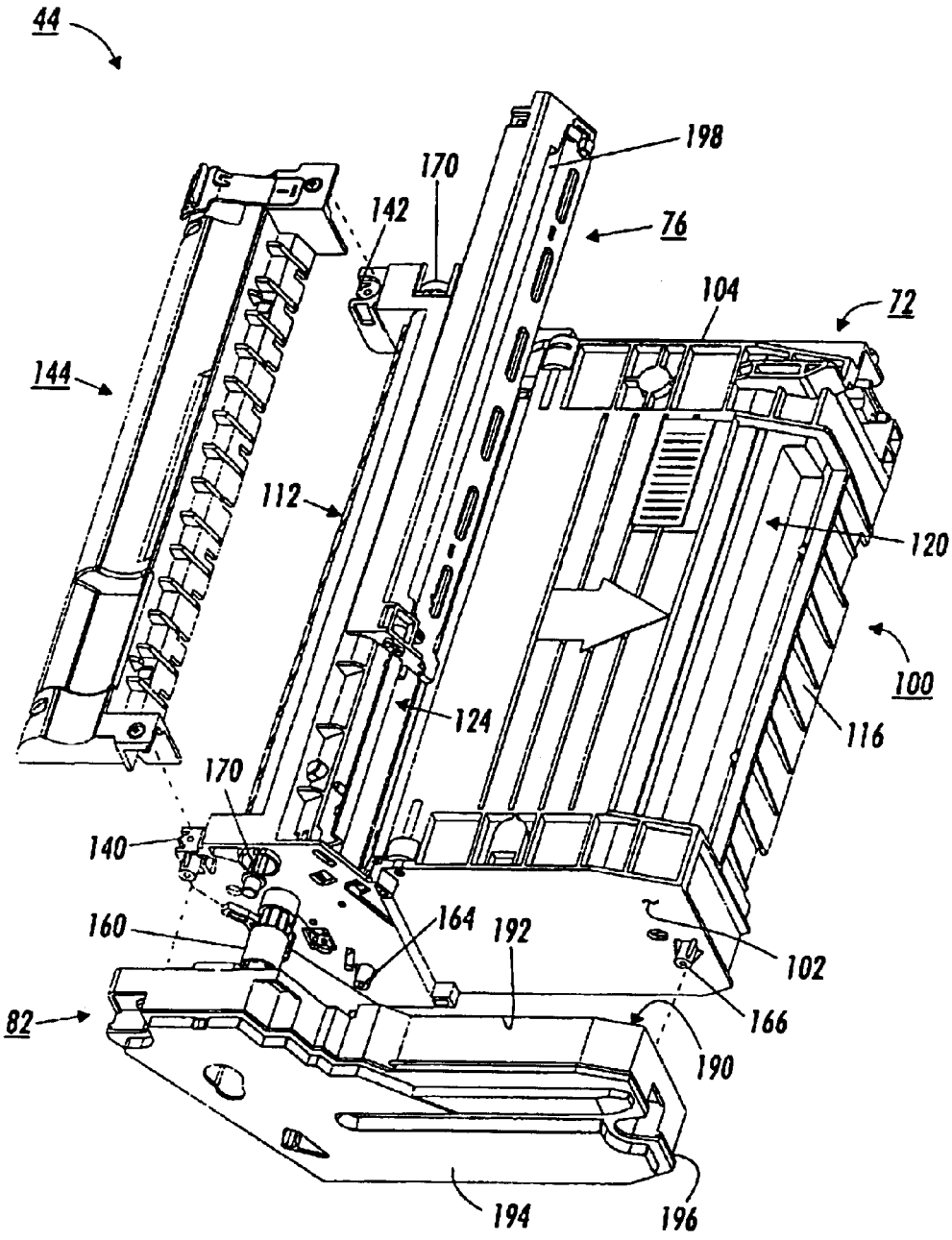
FIG. 5 is an exploded view of the various subassemblies of the CRU or process cartridge module of the machine of FIG. 1.

Referring in particular to FIG. 2, the first side wall 102 includes electrical connectors 148, 150 for supplying power from the ECS/PS module 30 (FIG. 1) via the sump subassembly 82 to the charging subassembly 76. It also includes an electrical connector 152 for supplying an electrical bias to the developer subassembly 78, as well as an alignment member 154 for aligning the detack device 68 (FIG. 1) to the photoreceptor. As also shown, the first side wall 102 further includes an apertured retainer device 156 for receiving an electrical grounding pin 160 for the photoreceptor 84. Importantly, the first side wall 102 further includes mounting members 162, 164, 166 for mounting the sump subassembly 82 to the module housing 100, and an opening for mounting an auger 170 of the cleaning subassembly 80 (FIGS. 1 and 5). The opening 168 also passes waste toner received from the photoreceptor 84 in the raised rear end 112, into the sump assembly 82, when mounted as above.

Referring now to FIG. 3, the developer subassembly 78 of the process cartridge module 44 is illustrated with an expandable bottom member 172 unattached in order to reveal the inside of the developer subassembly. As shown, the developer subassembly 78 comprises a generally rectangular developer housing 174 having the bottom member 172, the top 146, a first side 176, a second and opposite side 178, a front end 180 (relative to cartridge insertion), and a rear end 182. The developer housing 174 is for containing developer material, such as, single component magnetic toner (not shown), and it additionally houses the magnetic developer roll 92 (FIG. 1), a development bias application device 184, and a pair of developer material or toner agitators 186, 188.

Figure 4:
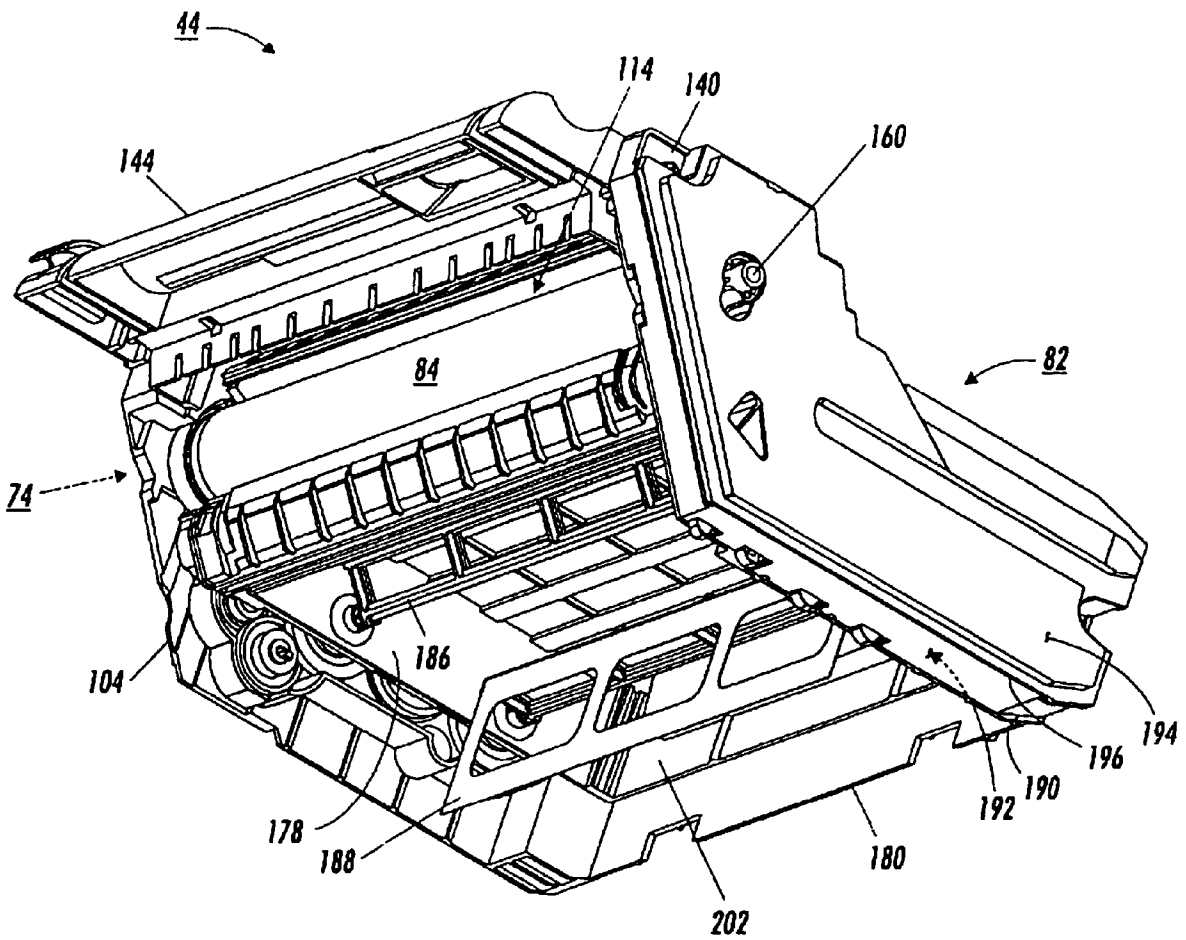
FIG. 4 is an open bottom perspective view of the CRU or process cartridge module of the machine of FIG. 1.

As shown in FIG. 4, the developer subassembly 78 is mounted to the module housing 100, and inside the trough region 118. With the bottom member 172 of the developer housing removed (for illustration purposes only), the agitators 186, 188 can clearly be seen. Also shown in FIG. 4 are the photoreceptor or drum 84 mounted within the raised rear end 112 of the module housing 100, as well as, the module handle 144 attached to the side walls 102, 104 at the raised rear end 112. The whole sump subassembly 82 is further shown with an outside surface 190 of its inside wall 192, mounted to the first side wall 102 of the module housing 100. The outside surface 194 of the outside wall 196 of the sump assembly is also clearly visible. The inside wall 192 and outside wall 196 partially define the sump cavity (not shown) for containing received waste toner, as above.

Referring now to FIG. 5, there is presented an exploded perspective view of the various subassemblies, as above, of the CRU or process cartridge module 44. As shown, the module handle 144 is attachable to mounting members 140, 142 at the raised rear end 112 of the module housing 100, and the sump subassembly 82 is mountable to the first side wall 102 of the cartridge housing. The developer subassembly 78 is mounted within the trough region 118 of the module housing 100, and is partially visible through the first cutout 120. Advantageously, the developer subassembly fits into the trough region 118 such that the top 146 (FIG. 3) of the developer subassembly and the inside of the top wall 106 of the module housing define the first light path 122 for the exposure light 88 from the ROS 38 (FIG. 1). As also shown, the charging subassembly 76 is mountable, at the second cutout 124, to the module housing 100, and includes a slit 198, through the charging subassembly, that defines part of the second light path 126 for the erase light 128 to pass to the photoreceptor 84.

Figure 6:
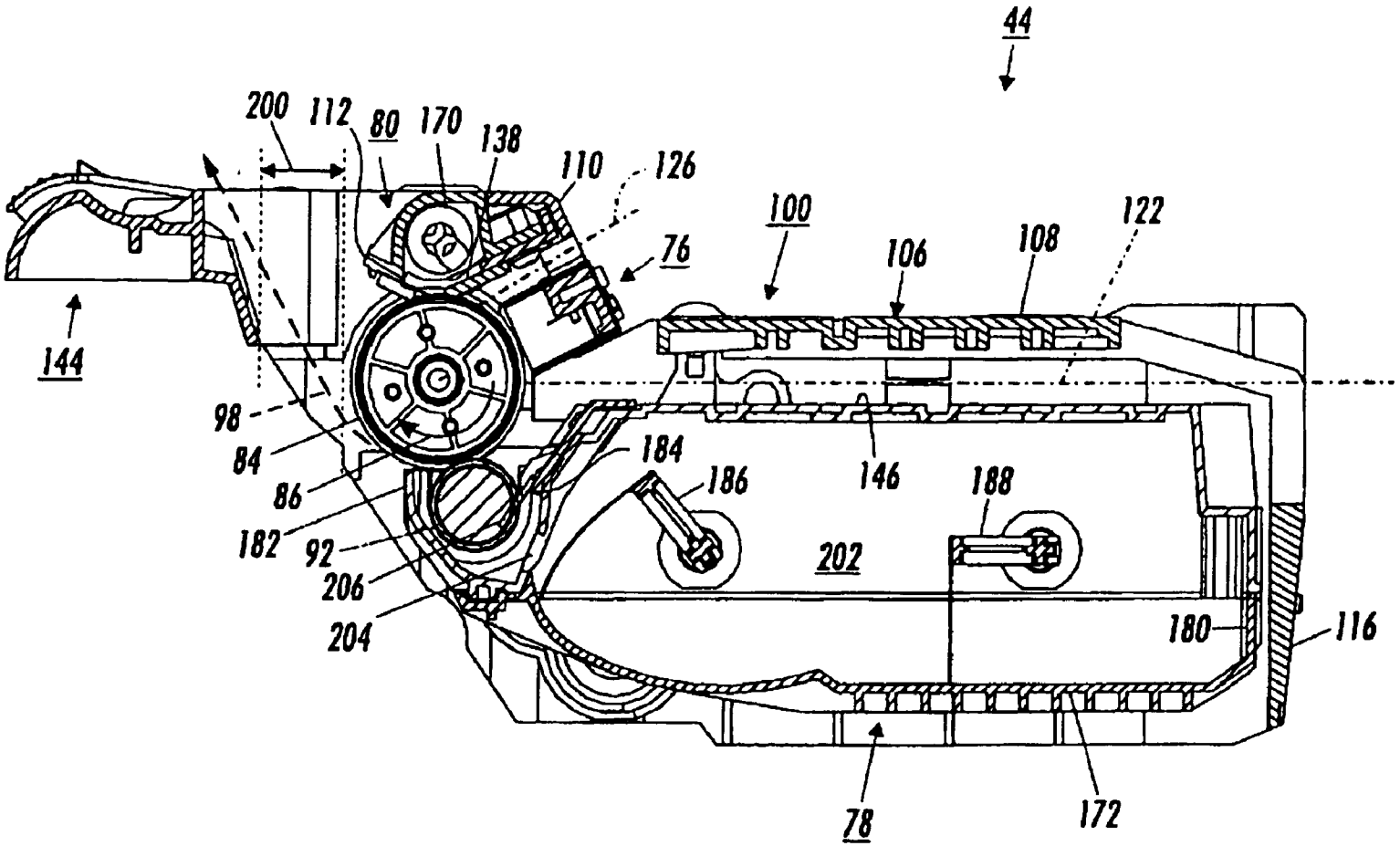
FIG. 6 is a vertical section (front-to-back) of the CRU or process cartridge module of the machine of FIG. 1.

Referring next to FIG. 6, a vertical (rear-to-back) section of the CRU or process cartridge module 44 as viewed along the plane 6—6 of FIG. 5 is illustrated. As shown, the developer subassembly 78 is mounted within the trough region 118 of the module housing subassembly 72 as defined in part by the front end wall 116, the second side wall 104, and the top wall 106 of the module housing subassembly. The module handle 144 as attached to mounting members 140, 142, (only one of which is visible), forms a portion of the sheet or paper path 98 of the machine 20 (FIG. 1) by being spaced a distance 200 from photoreceptor 84 in the raised rear end 112 of the module housing 100. The photoreceptor or drum 84 is mounted to the side walls 102, 104, (only one of which is visible), and as shown is located within the raised rear end 112 and is rotatable in the direction of the arrow 86. The charging subassembly 76 is mounted within the second cutout 124 in the top wall 106 and includes the slit 198 defining part of the second light path 126 for erase light 128 to pass to the photoreceptor 84. Upstream of the charging subassembly 76, the cleaning subassembly 80, including the cleaning blade 138 and the waste toner removing auger 170, is mounted within the raised rear end 112, and into cleaning contact with the photoreceptor 84. As further shown, the top wall 106 of the module housing 100 is spaced from the top 146 of the developer subassembly 78, thus defining the part of first light path 122 for the exposure light 88 from the ROS 38 (FIG. 1). The first light path 122 is located so as to be incident onto the photoreceptor at a point downstream of the charging subassembly 76.

The front 180, top 146, and bottom member 172 of the developer subassembly define a chamber 202, having an opening 204, for containing developer material (not shown). The first and second agitators 186, 188 are shown within the chamber 202 for mixing and moving developer material towards the opening 204. The developer material biasing device 184 and a charge trim and metering blade 206 are mounted at the opening 204. As also shown, the magnetic developer roll 92 is mounted at the opening 204 for receiving charged and metered developer material from such opening, and for transporting such developer material into a development relationship with the photoreceptor 84.

Figure 7:
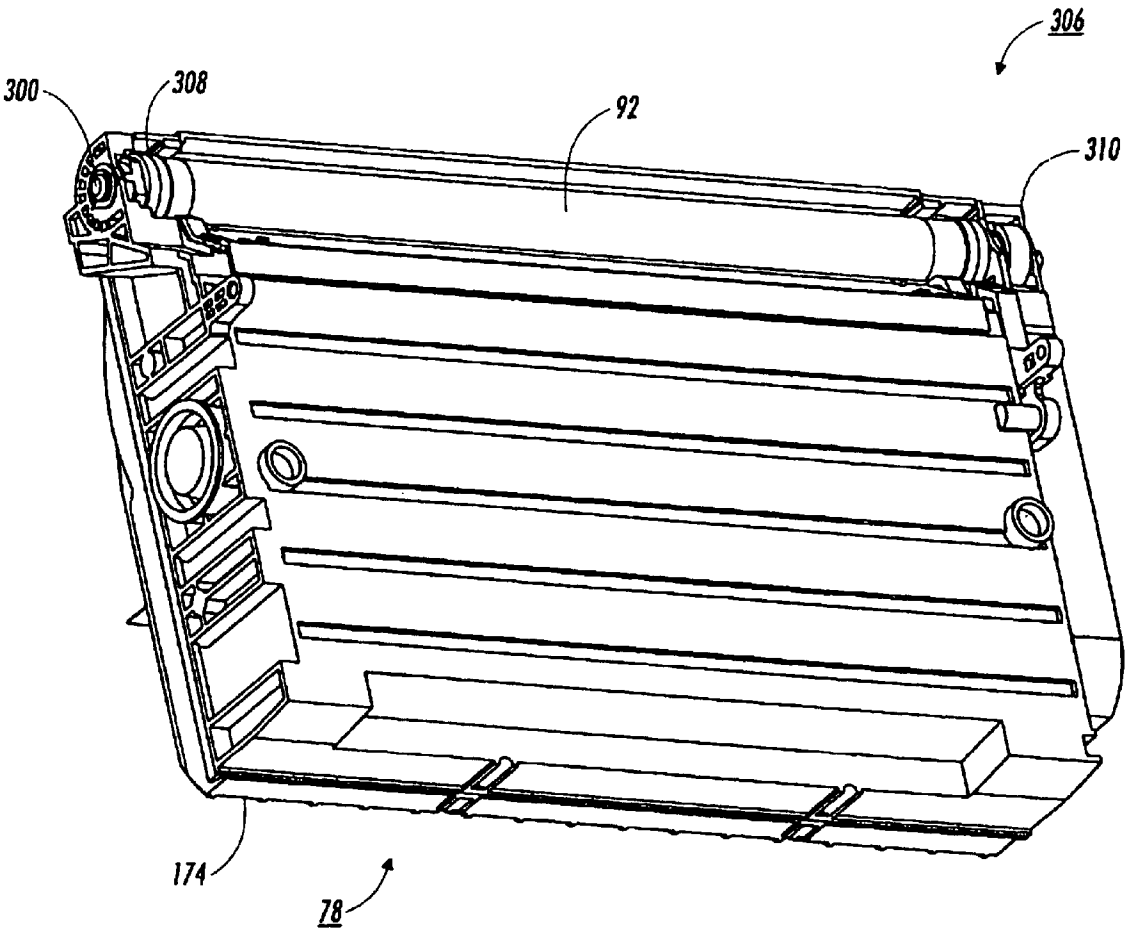
FIG. 7 is a perspective view of the developer subassembly of the CRU or process cartridge module of the machine of FIG. 1 showing the development bias connector with integral bearing support of the present invention.

According to the present invention and referring now to FIG. 7, conductive bearing support 300 is shown. As shown in FIG. 7, conductive bearing support 300 is utilized to support roll 92 and to rotatively mount roll 92 within housing 174 of the developer module 78. While the bearing support 300, as shown in FIG. 7, is used to support the roll 92 at first end 308 of the roll 92, it should be appreciated that the conductive bearing support 300 may likewise be utilized at, for example, second end 310 of roll 92 or to support a paddle, auger or photoreceptor drum or any other component within the process cartridge 72 (see FIG. 6).

Figure 8:
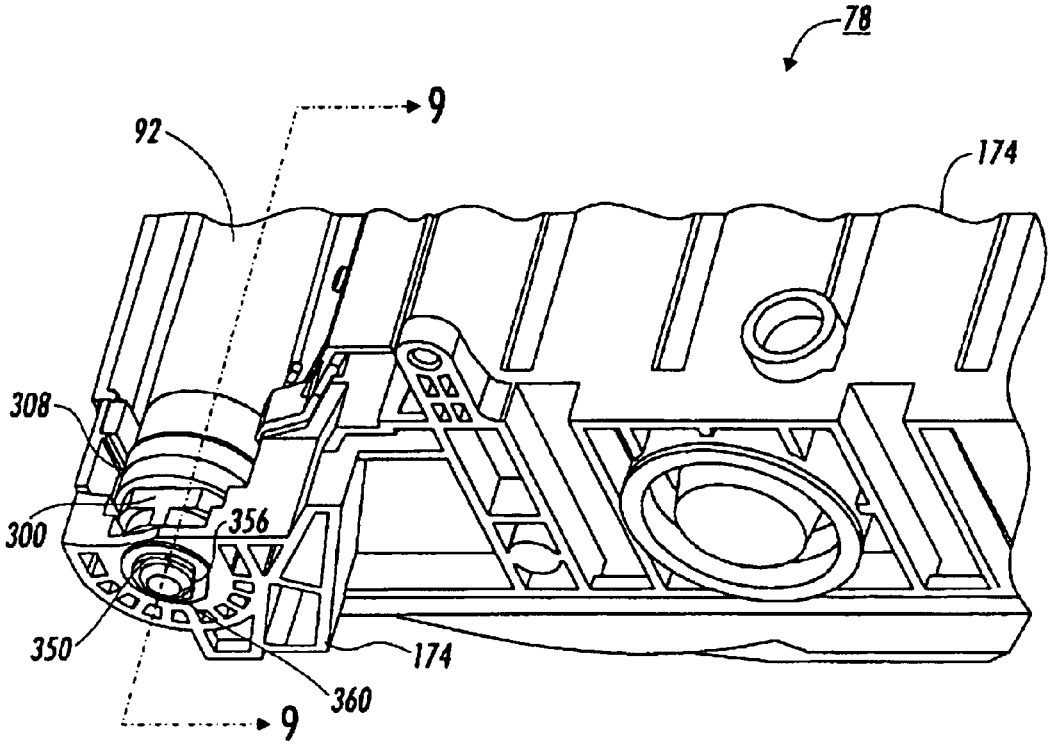
FIG. 8 is a partial perspective view of the developer subassembly of FIG. 7.

Referring now to FIG. 8, the bearing support 300 is shown in greater detail. The bearing support 300 is fixedly secured to housing 174 of the developer unit 78. The bearing support 300 is thus positioned between the housing 174 and first end 308 of the roll 92.

Referring now to FIG. 9, the bearing 300 is shown in further detail.

The development roll 92, as shown in FIG. 9, includes a fixedly mounted core 312 and a sleeve 314 which is rotatably mounted around core 312. The core 312 may be made of any suitable durable material which is magnetically conductive, for example, a metal or a magnetically conductive plastic. As shown in FIG. 9, the core 312 is made of ferrous steel. The core 312 includes magnetic poles 316 which are angularly positioned with respect to roll centerline 320. The poles 316 are so angularly positioned to provide an optimum magnetic field for the proper development of the marking particles.

The sleeve 314 is spaced from and rotatably mounted with respect to core 312. The sleeve 314 is made of preferably a magnetically non-conductive and an electrically conductive material. For example, the sleeve 314 may be made of aluminum. The development roll 92 also preferably includes an end cap 322 which is fixedly secured to sleeve 314 and rotates therewith. The sleeve end cap 322 may be made of any suitable durable electrically conductive material. For example, the end cap 322 may be made of a conductive plastic.

To provide proper spacing between the developer roll 92 and the photoconductive surface of the photoreceptor (not shown), the developer roll 92 preferably further includes a development roll sleeve or (DSR) sleeve 324. The DSR sleeve 324 has a thickness T which sets the gap between the developer roll 92 and the photoconductive surface. The DSR sleeve 324 is fixedly secured to the sleeve 314 and rotates therewith. Thus, the DSR sleeve 324 is in rolling contact with the photoconductor surface of the photoconductive drum.

The conductive bearing support 300 includes a first feature 326 which cooperates with the development roll 92. According to the present invention, the first feature 326 may be in any form capable of providing support to the development roll 92. For example, the first feature 326 may be in the form of a journal or a bore cooperating with a mating feature on the development roll 92.

While the development roll may be in the form of a single rotating component, preferably, as shown in FIG. 9 the development roll 174 includes the stationary core 312 as well as the rotating sleeve 314. The first feature 326 provides for the rotation of the sleeve end cap 322 which is a part of the development roll 92. The sleeve end cap 322 rotates relative to the conductive bearing support 300.

As shown in FIG. 9, the sleeve end cap 322 includes an inner hub 330 which mates with middle bore 332 of conductive bearing support 300. Further, as shown in FIG. 9, the sleeve end cap 322 may include a larger hub 334 which matingly fits with large bore 336 of conductive bearing support 300.

The core 312 is positioned fixedly to housing 174 by small bore 340 of the support 300 which matingly fits with journal diameter 342 of the core 312. Preferably, to angularly orient the poles 316 in the core 312 of the development roll 92, the journal 342 of the development roll 92 includes a flat 344 which mates with flat 346 within bore 340 of the housing support 300.

The conductive bearing support 300 is fixedly secured to the development housing 174 by any suitable manner. For example, as shown in FIG. 9, the bearing support 300 includes small OD 350, medium OD 352, and large OD 354 which mate with corresponding bores in the housing 174. It should be appreciated that any or all of the small OD, middle OD 352, and large OD 354 may be either in clearance or matingly fitted to the respective bore of the housing.

Referring again to FIG. 8, to angularly orient the conductive bearings support 300 with respect to the housing 174, preferably, the bearing support 300 includes a locating feature in the form of a flat 356 formed from small OD 350. Correspondingly, the housing 174 includes a flat 360 which mates with flat 356 of the conductive bearing support 300. The flat 350 on the housing 174, the flat 346 on the exterior of the support 300, the flat 344 on the interior of the support 300, and the flat 332 on core 312 cooperate to angularly orient the poles of the core 312.

Referring again to FIG. 9, preferably, the bearing support 300 further includes an outer end face 370 which contacts and restrains the development roll spacing sleeve 324 between the sleeve 314 of the development roll 92 and the housing 300.

The conductive bearing support 300 further serves an important function by providing an electrical path from the power supply to the electrically conductive sleeve 314 of the roll 92. As shown in FIG. 9, the conductive bearing support 300 is in contact at large bore 336 and middle bore 332 with sleeve endcap 322. The sleeve endcap 322 is in electrical contact with the sleeve 314. The sleeve endcap 322 thus provides an electrical connection between the conductive bearing support 300 and the sleeve 314.

The conductive support 300 is made of any suitable durable material which is electrically conductive. The support thus can be made of a durable metal or, as shown in FIG. 9, be made of a electrically conductive plastic. For example, the support 300 may be made of a polycarbonate with carbon fibers.

The support 300 includes a feature 372 which extends outwardly from the development housing 174 and serves to provide an electrical path from the power source (not shown) to the development roll 92. For example, as shown in FIG. 9, the conductive bearing support 300 includes the central hub 372. The central hub 372 includes an outer face 374 which provides for the electrical contact for the development roll 92. The outer face 374 may be contacted with the power supply in any suitable fashion.

Figure 10:
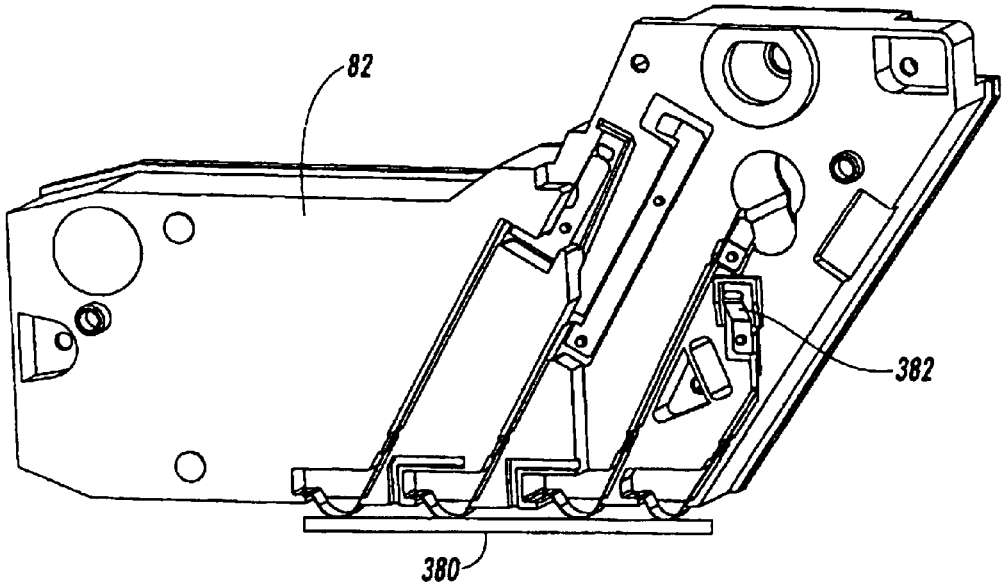
FIG. 10 is a perspective view of a waste toner sump for the process cartridge of FIG. 2 showing the electrical lead for cooperating with the integral bearing support.

Referring now to FIG. 10, waste toner housing 82 is shown. The waste toner housing 82 provides an electrical path from the face 374 of the conductive bearing support 300 to the power supply board 380. An electrical contact 382 is positioned such that spring loaded contact 382 contacts the face 374 of the conductive bearing support 300. An electrical contact made of a suitable material, i.e. stainless steel 384 interconnects contact 382 with the board 380.

Figure 11:
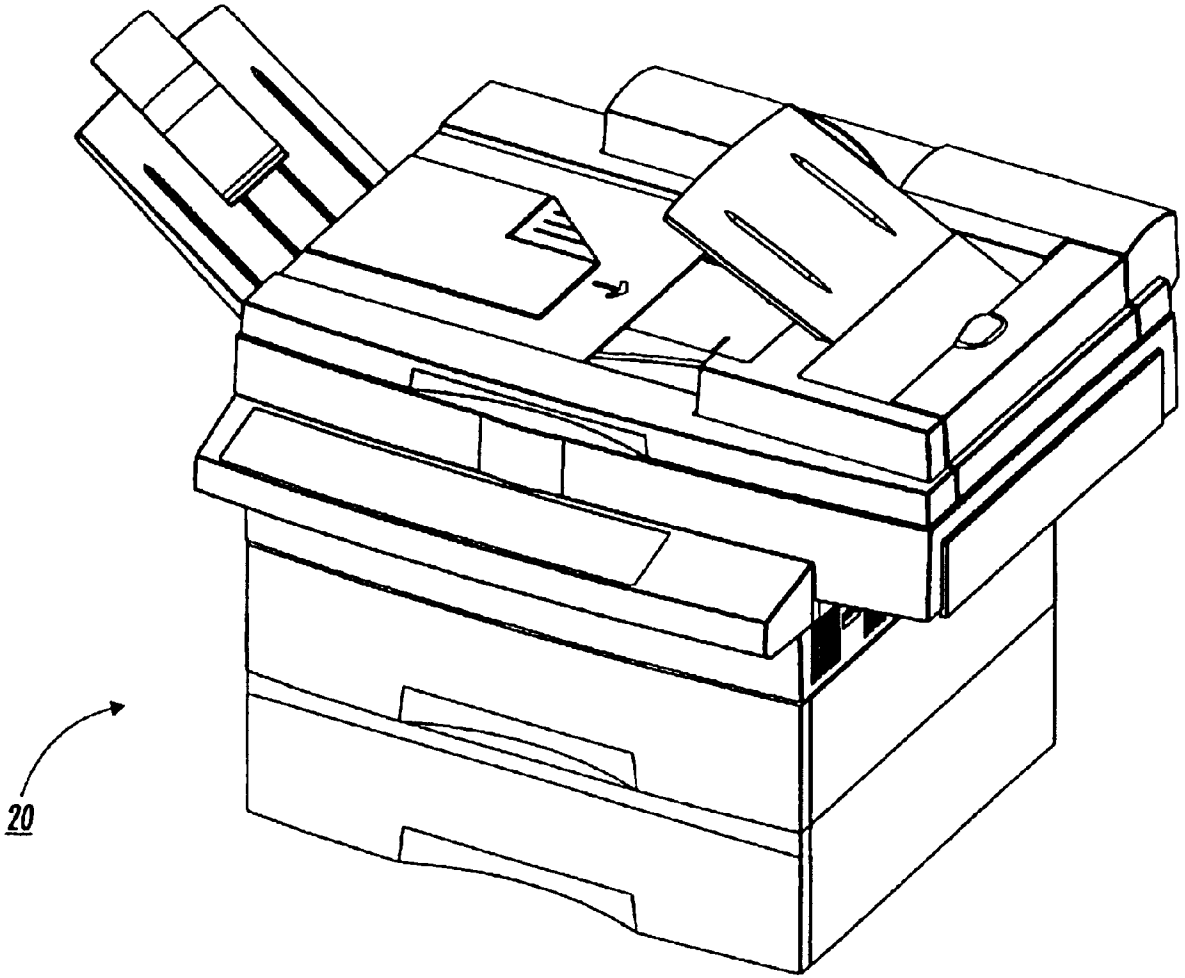
FIG. 11 is a perspective view of the machine of FIG. 1.

Referring now to FIG. 11, a printing machine utilizing the conductive bearing support of the present invention is shown.

By providing an electrically conductive bearing support for a development roller, a low cost, simple bearing support may be provided to the development roll.

By providing an electrically conductive bearing support, a simple, reliable conductive path can be had from the development roll to a power supply.

By providing an electrically conductive bearing support including a centrally located hub extending therefrom, a simple, electrical connection may be had upon insertion of a development unit into a cartridge unit.

By providing an electrically conductive bearing support made of an electrically conductive plastic, a simple inexpensive and low cost recyclable bearing support may be provided.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A bearing support for use in a process cartridge including a roll rotatably mounted to a housing, the roll for transporting marking particles to a latent image to form a developed image, said bearing support supporting the roll and providing an electrical path between the roll and a voltage source, said bearing support comprising a body including:

a first feature for cooperation with the roll;

a second feature for cooperation with the housing, at least one of said first feature and said second feature providing for rotatable motion between the housing and the roll; and a third feature for providing an electrical path between the roll and the voltage source, *wherein said third feature is defined by an external face, said face providing an electrical path to the voltage source*.

2. A bearing support according to claim 1, wherein said body comprises a generally cylindrical shape.

3. A bearing support according to claim 2, wherein said first feature is defined by a bore in said body, said body operably secured to the roll at said bore.

4. A bearing support according to claim 1, wherein said second feature is defined by an outer periphery of said body, said outer periphery fitted to the housing.

[5. A bearing support according to claim 1, wherein said third feature is defined by an external face, said face providing an electrical path to the voltage source.]

6. A bearing support according to claim 1, wherein said body comprises an electrically conductive plastic.

7. A bearing support according to claim 1, wherein said body comprises carbon fibers.

8. A process cartridge for use in a printing machine [comprising], said process cartridge for applying marking particles to a latent image to form a developed image, said cartridge comprising:

a housing;

a bearing support mounted to said housing;

a roll rotatably mounted to said bearing, said roll for transporting marking particles to the latent image to form the developed image and for receiving an electrical charge from a voltage source, said bearing support supporting the roll and providing an electrical path between the roll and the voltage source, said bearing support including a body having a first feature for cooperation with the roll, a second feature for cooperation with the housing, at least one of said first feature and said second feature providing for rotatable motion between the housing and the roll and a third feature for providing an electrical path between the roll and the voltage source, *wherein said third feature is defined by an external face, said face providing an electrical path to the voltage source*.

9. A cartridge according to claim 8, wherein said body comprises a generally cylindrical shape.

10. A cartridge according to claim 8, wherein said first feature is defined by a bore in said body, said body operably secured to the roll at said bore.

11. A cartridge according to claim 8, wherein said second feature is defined by an outer periphery of said body, said outer periphery fitted to the housing.

[12. A cartridge according to claim 8, wherein said third feature is defined by an external face, said face providing an electrical path to the voltage source.]

13. A cartridge according to claim 8, wherein said body comprises an electrically conductive plastic.

14. A cartridge according to claim 8, wherein said body comprises carbon fibers.

15. An electrophotographic printing machine of the type including a process cartridge for applying marking particles to a latent image to form a developed image, the process cartridge comprising:

a housing;

a bearing support mounted to said housing;

a roll rotatably mounted to said bearing, said roll for transporting marking particles to the latent image to form the developed image and for receiving an electrical charge from a voltage source, said bearing support supporting the roll and providing an electrical path between the roll and the voltage source, said bearing support including a body having a first feature for cooperation with the roll, a second feature for cooperation with the housing, at least one of said first feature and said second feature providing for rotatable motion between the housing and the roll and a third feature for providing an electrical path between the roll and the voltage source, *wherein said third feature is defined by an external face, said face providing an electrical path to the voltage source*.

16. A printing machine according to claim 15, wherein said body comprises a generally cylindrical shape.

17. A printing machine according to claim 16, wherein said first feature is defined by a bore in said body, said body operably secured to the roll at said bore.

18. A printing machine according to claim 15, wherein said second feature is defined by an outer periphery of said body, said outer periphery fitted to the housing.

[19. A printing machine according to claim 15, wherein said third feature is defined by an external face, said face providing an electrical path to the voltage source.]

20. A printing machine according to claim 15, wherein said body comprises an electrically conductive plastic.

21. A printing machine according to claim 15, wherein said body comprises carbon fibers.

*22. A bearing support for use in a process cartridge including a roll rotatably mounted to a housing, the roll for transporting marking particles to a latent image to form a developed image, said bearing support interfacing with the roll and providing an electrical path between the roll and a voltage source, said bearing support comprising a body including:*

*a first feature for cooperation with the roll;*

*a second feature for cooperation with the housing, at least one of said first feature and said second feature providing for rotatable motion between the housing and the roll; and*

*a third feature for providing an electrical path between the roll and the voltage source, wherein said third feature includes a surface contactable from outside the housing.*

*23. A bearing support as recited in claim 22, wherein said surface extends in an axial direction away from the first and second features.*

*24. A bearing support assembly for use in a process cartridge including a roll rotatably mounted to a housing, the roll for transporting marking particles to a latent image to form a developed image, said bearing support assembly interfacing with the roll and providing an electrical path between the roll and a voltage source, said bearing support assembly comprising:*

*a first surface that rotatably engages the roll and provides for rotatable motion between the housing and the roll;*

*a second surface that engages the housing; and*

*a conductive member that provides the electrical path between the voltage source and roll via the first and second surfaces, said conductive member extending at least partially through the housing.*

*25. A bearing support assembly for use in a process cartridge including a roll rotatably mounted to a housing, the roll for transporting marking particles to a latent image to form a developed image, said bearing support assembly interfacing with the roll and providing an electrical path between the roll and a voltage source, said bearing support assembly comprising:*

*a body having a first feature that rotatably engages the roll and a second feature that engages the housing, such that the first feature provides for rotatable motion between the housing and the roll; and*

*a conductive member that provides an electrical path between the roll and the voltage source;*

*said conductive member extending a least partially through the housing.*

*26. A bearing support assembly for use in a process cartridge including a roll rotatably mounted to a housing, the roll for transporting marking particles to a latent image to form a developed image, said bearing support assembly interfacing with the roll and providing an electrical path between the roll and a voltage source, said bearing support assembly comprising:*

*a first surface that rotatably engages the roll and provides for rotatable motion between the housing and the roll,*

*a second surface that engages the housing, and*

*a conductive assembly for providing an electrical path between the roll and the voltage source, said conductive assembly extending from inside the housing to at least partially through an opening in the housing and being contactable by the voltage source from outside the housing.*

*27. A bearing support for use in a process cartridge including a roll rotatably mounted to a housing, the roll for transporting marking particles to a latent image to form a developed image, said bearing support interfacing with the roll and providing an electrical path between the roll and a voltage source, said bearing support comprising:*

*a first surface that rotatably engages the roll and provides for rotatable motion between the housing and the roll,*

*a second surface that engages the housing, and*

*a feature for providing the electrical path between the roll and the voltage source, the feature having a third surface for contact with the voltage source to provide part of the electrical path, said third surface being coaxial with said first surface.*

*28. A bearing support for use in a process cartridge including a roll rotatably mounted to a housing, the roll for transporting marking particles to a latent image to form a developed image, said bearing support interfacing with the roll and providing an electrical path between the roll and a voltage source, said bearing support comprising:*

*a first surface that rotatably engages the roll and provides for rotatable motion between the housing and the roll,*

*a second surface that engages the housing, and*

*a feature for providing the electrical path between the roll and the voltage source, the feature having a third surface for contact with the voltage source to provide part of the electrical path, said third surface providing contact with the voltage source around the axis of the roll.*

* * * * *